United States Patent
Muffler

(10) Patent No.: US 7,414,595 B1
(45) Date of Patent: Aug. 19, 2008

(54) VIRTUAL MOSAIC WIDE FIELD OF VIEW DISPLAY SYSTEM

(75) Inventor: Ronald J. Muffler, Salt Lake City, UT (US)

(73) Assignee: Advanced Simulation Displays Co., Salt Lake City, UT (US)

( * ) Notice: Subject to any disclaimer, the term of this patent is extended or adjusted under 35 U.S.C. 154(b) by 676 days.

(21) Appl. No.: 10/730,422

(22) Filed: Dec. 7, 2003

(51) Int. Cl.
*G09G 5/00* (2006.01)

(52) U.S. Cl. .......................................... 345/7; 345/32

(58) Field of Classification Search .................. 345/7, 345/8, 32, 1.1, 1.3, 629–635
See application file for complete search history.

(56) References Cited

U.S. PATENT DOCUMENTS

| | | | |
|---|---|---|---|
| 4,003,080 A | 1/1977 | Maiman et al. ............... 358/63 |
| 4,536,061 A | 8/1985 | Nisimura .................... 350/354 |
| 4,653,862 A | 3/1987 | Morozumi ............... 350/339 F |
| 4,791,417 A | 12/1988 | Bobak ........................ 340/784 |
| 4,799,050 A | 1/1989 | Prince et al. ................ 340/765 |
| 4,917,465 A | 4/1990 | Conner et al. .............. 350/335 |
| 4,931,787 A | 6/1990 | Shannon .................... 340/784 |
| 4,966,441 A | 10/1990 | Conner ....................... 350/335 |
| 5,012,274 A | 4/1991 | Dolgoff ....................... 340/702 |
| 5,019,808 A | 5/1991 | Prince et al. ................ 340/765 |
| 5,046,827 A | 9/1991 | Frost et al. ................... 359/54 |
| 5,050,965 A | 9/1991 | Conner et al. ................ 359/53 |
| 5,101,279 A | 3/1992 | Kurematsu et al. .......... 358/241 |
| 5,124,818 A | 6/1992 | Conner et al. ................ 359/53 |
| 5,130,794 A | 7/1992 | Richey ........................ 358/87 |
| 5,132,839 A | 7/1992 | Travis ......................... 359/462 |
| 5,157,503 A | 10/1992 | Dugdale ..................... 358/238 |
| 5,241,389 A | 8/1993 | Bilbrey ....................... 358/181 |
| 5,300,942 A | 4/1994 | Dolgoff ....................... 345/32 |
| 5,337,068 A | 8/1994 | Stewart et al. ................ 345/88 |
| 5,371,510 A * | 12/1994 | Miyauchi et al. ............... 345/7 |
| 5,381,187 A | 1/1995 | Takamatsu et al. .......... 348/759 |
| 5,386,253 A | 1/1995 | Fielding ..................... 348/745 |
| 5,436,635 A | 7/1995 | Takahara et al. ............. 345/92 |
| 5,491,491 A * | 2/1996 | Lebby et al. .................... 345/7 |
| 5,504,597 A | 4/1996 | Sprague et al. ............... 359/40 |
| 5,504,598 A | 4/1996 | Sprague et al. ............... 359/41 |
| 5,555,035 A | 9/1996 | Mead et al. ................. 348/757 |
| 5,565,742 A | 10/1996 | Shichao et al. .............. 315/366 |
| 5,583,669 A | 12/1996 | Fushimi et al. ................ 349/5 |
| 5,602,679 A | 2/1997 | Dolgoff et al. .............. 359/640 |
| 5,621,284 A | 4/1997 | Shichao et al. .............. 315/366 |
| 5,649,032 A | 7/1997 | Burt et al. ................... 382/284 |
| 5,664,158 A | 9/1997 | Larimer ...................... 395/500 |
| 5,668,435 A | 9/1997 | Uchida et al. ............... 313/414 |
| 5,673,091 A | 9/1997 | Boisdron et al. .............. 348/58 |
| 5,689,283 A | 11/1997 | Shirochi ..................... 345/132 |
| 5,689,315 A | 11/1997 | Fushimi et al. ................ 349/5 |
| 5,701,445 A | 12/1997 | Tang et al. .................. 395/516 |

(Continued)

*Primary Examiner*—Ricardo L Osorio
(74) *Attorney, Agent, or Firm*—Echelon IP, LLC; Lloyd W. Sadler; Everett D. Robinson

(57) ABSTRACT

A display system, which is useful for simulation, and training system that provides a mosaic wide field of view display by alternating virtual and direct view display images through the use of a new optical beamsplitter/combiner device. Edge blending and the use of flat panel display devices are used to provide a high brightness, high contrast, high reliability, and continuous unobstructed field of view. The new optical beamsplitter/combiner has an optically flat reflective portion and a curved transmissive portion.

24 Claims, 9 Drawing Sheets

U.S. PATENT DOCUMENTS

| | | | |
|---|---|---|---|
| 5,703,621 A | 12/1997 | Martin et al. | 345/147 |
| 5,715,022 A | 2/1998 | Takasmatsu et al. | 348/759 |
| 5,721,585 A | 2/1998 | Keast et al. | 348/36 |
| 5,726,719 A | 3/1998 | Tanaka et al. | 349/8 |
| 5,751,390 A | 5/1998 | Crawford et al. | 349/120 |
| 5,760,755 A | 6/1998 | Engle | 345/85 |
| 5,760,850 A | 6/1998 | Nakanishi et al. | 349/5 |
| 5,821,911 A * | 10/1998 | Jachimowicz | 345/7 |
| 5,831,701 A | 11/1998 | Matsuyama et al. | 349/110 |
| 5,847,784 A | 12/1998 | Finnila et al. | 349/73 |
| 5,900,982 A | 5/1999 | Dolgoff et al. | 359/619 |
| 5,969,711 A | 10/1999 | Menzel | 345/179 |
| 5,969,832 A | 10/1999 | Nakanishi et al. | 359/15 |
| 5,971,546 A | 10/1999 | Park | 353/38 |
| 5,986,622 A | 11/1999 | Ong | 345/1 |
| 5,991,444 A | 11/1999 | Burt et al. | 382/232 |
| 6,040,887 A | 3/2000 | Matsuyama et al. | 349/141 |
| RE36,654 E | 4/2000 | Conner et al. | 349/6 |
| 6,075,504 A | 6/2000 | Stoller | 345/60 |
| 6,078,371 A | 6/2000 | Ichikawa et al. | 349/95 |
| 6,128,054 A | 10/2000 | Schwarzenberger | 349/73 |
| 6,157,420 A | 12/2000 | Nakanishi et al. | 349/9 |
| 6,163,349 A | 12/2000 | Nakanishi et al. | 349/5 |
| 6,181,302 B1 * | 1/2001 | Lynde | 345/7 |
| 6,195,184 B1 | 2/2001 | Chao et al. | 359/32 |
| 6,252,564 B1 | 6/2001 | Albert et al. | 345/1 |
| 6,266,037 B1 | 7/2001 | Flasck | 345/92 |
| 6,266,113 B1 | 7/2001 | Yamazaki et al. | 349/115 |
| 6,330,112 B1 | 12/2001 | Kaise et al. | 359/621 |
| 6,332,684 B1 | 12/2001 | Shibatani et al. | 353/31 |
| 6,346,928 B1 | 2/2002 | Biverot | 345/7 |
| 6,351,335 B1 | 2/2002 | Perlin | 359/618 |
| 6,356,332 B1 | 3/2002 | Ichikawa et al. | 349/146 |
| 6,393,163 B1 | 5/2002 | Burt et al. | 382/294 |
| 2002/0077172 A1 * | 6/2002 | Uchiyama et al. | 463/20 |

* cited by examiner

VIRTUAL MOSAIC WIDE FIELD OF VIEW DISPLAY SYSTEM

BACKGROUND OF INVENTION

1. Field of the Invention

This invention relates to visual display systems. More specifically, this invention relates to visual display systems, which provide a large field of view for accurately viewing a computer generated environment.

2. Description of Related Art

Many simulation applications, such as aircraft pilot training ground vehicle driver training and entertainment, require or are enhanced by a very large field of view visual display system that will allow the user to accurately view the surrounding environment. Not only does a typical user need to see directly ahead, but often is required to view imagery to either side and in some applications a user is also required to see behind, above and/or below the user's position in the simulator. Also, for many training or entertainment tasks, it is important to provide the capability of high resolution in the visual display system.

When it is desirable to provide a large field of view display system with high resolution than is typically achievable with a single conventional video display device it is often necessary to mosaic or tile images from multiple video sources. It is possible to place adjacent video display devices together to increase the size of the viewable image and consequently the size of the field of view. The problem with this approach is that all known display devices inherently have physical packaging that extends beyond the boundary of the usable display surface. Therefore, whenever two or more of these display devices are abutted together there will always be a gap between the adjacent displays that prevents the user from viewing an uninterrupted continuous displayed scene.

A wide variety of display systems adapted for use with computer-generated imagery are well known in the art. Prior techniques include optically overlapping projected imagery from multiple projectors, which project onto a flat screen or a spherical projection screen, and rear projection onto a set of translucent projection screens that are arranged around the observer in an abutted fashion to provide a continuous scene with gaps between the screens.

Although not necessarily "prior art", the reader is referred to the following U.S. patent documents for general background material. Each of these patents is hereby incorporated by reference in its entirety for the material contained therein.

U.S. Pat. No. 4,003,080 describes a large screen display system for video modulated collimated light.

U.S. Pat. No. 4,536,061 describes a display effected by utilizing bubbles formed in a liquid layer by heat.

U.S. Pat. No. 4,653,862 describes a multi-color liquid crystal display that includes liquid crystal micro-shutters, which open and close color filters arranged as dots in a mosaic or stripe pattern.

U.S. Pat. No. 4,791,417 describes a two-dimensional display panel composed of interchangeable unit modules.

U.S. Pat. No. 4,799,050 describes a liquid crystal display that provides a high quality color image and efficient energy utilization.

U.S. Pat. No. 4,917,465 describes a display system formed by stacking three STN birefringent LCD panels that are tuned to different subtractive primary colors.

U.S. Pat. No. 4,931,787 describes a matrix display system that includes an active matrix display device.

U.S. Pat. No. 4,966,441 describes a color display system that includes two colored LCD panels operated in conjunction with a colored filter.

U.S. Pat. No. 5,012,274 describes an active matrix LCD light valve between crossed polarizers.

U.S. Pat. No. 5,019,808 describes a liquid crystal display that provides high quality color image and efficient energy utilization.

U.S. Pat. No. 5,046,827 describes an optical reconstruction filter in the form of a phase diffraction grating.

U.S. Pat. No. 5,050,965 describes a color display formed by staking two or more birefringent elements that are tuned to provide different spectral characteristics.

U.S. Pat. No. 5,101,279 describes a display apparatus that has a display device such as a liquid crystal display device having a plurality of optical-switching portions.

U.S. Pat. No. 5,124,818 describes an LCD display system formed by stacking two or more independently operated LCD elements.

U.S. Pat. No. 5,130,794 describes a panoramic image based virtual reality display system.

U.S. Pat. No. 5,132,839 describes a display video apparatus which provides a three dimensional image.

U.S. Pat. No. 5,157,503 describes a near-infinity image display system.

U.S. Pat. No. 5,241,389 describes a video display system which compensates for video processing delays in multiple, inter-coupled video processing subsystems.

U.S. Pat. No. 5,300,942 describes a light valve such as an active matrix LCD between crossed polarizers.

U.S. Pat. No. 5,337,068 describes a backlighted color LCD display formed by placing a single matrix of liquid crystal devices over a bank of red, green and blue fluorescent lamps.

U.S. Pat. No. 5,381,187 describes an image display apparatus, which includes: an optical system; a display means; and at least one projection lens.

U.S. Pat. No. 5,386,253 describes a projection system of the kind in which beams of light are projected by a projector onto a screen and the beams are modulated by electronic video information.

U.S. Pat. No. 5,436,635 describes a display device that uses pixel electrodes and thin film transistors arranged in a matrix.

U.S. Pat. Nos. 5,504,597 and 5,504,598 describes full color displays having a high efficiency light source optically coupled by a light coupling lens array to the active matrix of pixel elements of an image forming means.

U.S. Pat. No. 5,555,035 describes a projection apparatus comprising a high-resolution projection display system.

U.S. Pat. No. 5,565,742 describes an electronic fluorescent display with spacer elements used to provide rigid mechanical support between the face and back plates.

U.S. Pat. No. 5,583,669 describes a light valve apparatus.

U.S. Pat. No. 5,602,679 describes a light valve such as an active matrix LCD.

U.S. Pat. No. 5,621,284 describes a cathodoluminescent device that employs elongated grid electrodes for addressing and controlling the brightness of the display.

U.S. Pat. No. 5,649,032 describes a system for automatically generating a mosaic from a plurality of input images.

U.S. Pat. No. 5,664,158 describes a video display engineering and optimizing CAD simulation system for designing a LCD display.

U.S. Pat. No. 5,668,435 describes a color display system that includes a color cathode ray tube.

U.S. Pat. No. 5,673,091 describes a liquid crystal display device consisting of a system of pixel elements.

U.S. Pat. No. 5,689,283 describes a display, which increases the apparent resolution of an image displayed on an image display system.

U.S. Pat. No. 5,689,315 describes a light valve apparatus.

U.S. Pat. No. 5,701,445 describes an apparatus for generating pictures that comprises a memory device, an address generator, a vertical position detector, a register, a horizontal position counter, a processor and a state machine.

U.S. Pat. No. 5,703,621 describes an array of light control units that has an area large enough to present images for direct viewing.

U.S. Pat. No. 5,715,022 describes an image display apparatus, which includes: an optical system; a display means, and at least one projection lens for projecting the display image.

U.S. Pat. No. 5,721,585 describes a system performing capture and display of both still and real-time motion picture panoramic images.

U.S. Pat. No. 5,726,719 describes a projection-type color display device.

U.S. Pat. No. 5,760,755 describes a reflective deformable conductor in an electrostatic light valve system.

U.S. Pat. No. 5,760,850 describes a projection type color image display apparatus.

U.S. Pat. No. 5,831,701 describes a liquid crystal display device comprising a black mask formed on one of a pair of substrates at least one of which is transparent, a group of electrodes, a liquid crystal layer, an orientation control film, and a driver.

U.S. Pat. No. 5,847,784 describes a self-adjusting tiled image display system and method.

U.S. Pat. No. 5,900,982 describes a light valve projection system.

U.S. Pat. Nos. 5,969,711 and 5,751,390 describe transmissive, backlit color twisted-nematic or super-twisted-nematic liquid crystal displays.

U.S. Pat. No. 5,969,832 describes a projection image display device that includes a light source, an image display panel, an optical system, a projector, and a color changer.

U.S. Pat. No. 5,971,546 describes an image display device that includes a light source, a flat display panel, and at least one double refraction plate.

U.S. Pat. No. 5,986,622 describes a panel display system having at least one source device coupled to a plurality of interconnected display units.

U.S. Pat. No. 5,991,444 describes a system for automatically generating a mosaic from a plurality of input images.

U.S. Pat. No. 6,040,887 describes a liquid crystal display device comprising a black mask; a group of electrodes; a liquid crystal layer; an orientation control film; a polarizer, and a driver.

U.S. Pat. No. Re. 36,654 describes a color display that is formed by stacking two or more birefringent elements that are tuned to provide different spectral characteristics, and operating each of the elements independently.

U.S. Pat. No. 6,075,504 describes a high brightness presentation display system.

U.S. Pat. No. 6,078,371 describes a micro lens-equipped liquid crystal device capable of ensuring a high picture quality.

U.S. Pat. No. 6,128,054 describes an apparatus for displaying an image that has a display area, which comprises a plurality of displays such as LCDs or CRTs, each displaying a given part of the display area in a side-by-side arrangement facing in the same direction with gaps between them.

U.S. Pat. No. 6,157,420 describes a projection-type display apparatus that includes a light source; a color separating/synthesizing device; and three reflection-type display devices.

U.S. Pat. No. 6,163,349 describes a micro lens array provided on a light-outgoing side of a monochromic LCD element.

U.S. Pat. No. 6,195,184 B1 describes a real-time, dynamic, free space-virtual reality 3-D image display system.

U.S. Pat. No. 6,252,564 B1 describes a process for creating an electronically addressable display.

U.S. Pat. No. 6,266,037 B1 describes a wafer based active matrix reflective light encoding system.

U.S. Pat. No. 6,266,113 B1 describes a reflection type liquid crystal display device.

U.S. Pat. No. 6,330,112 B1 describes an optical modulator and image projection display apparatus.

U.S. Pat. No. 6,332,684 B1 describes a projection type color image display apparatus that includes: a light source section, a first and second fly-eye lens array; a micro lens array; a single image display device; a color separator; and a projection lens.

U.S. Pat. No. 6,346,928 B1 describes a method of presenting a complete image on the retina of an observer.

U.S. Pat. No. 6,351,335 B1 describes a foveated display.

U.S. Pat. No. 6,356,332 B1 describes a matrix substrate that includes a plurality of conductive members constituting pixels provided on a substrate.

U.S. Pat. No. 6,393,163 B1 describes a system for automatically generating a mosaic from a plurality of input images.

SUMMARY OF INVENTION

It is desirable to provide a large field-of-view display system for use in the display of a simulated and/or computer generated scene. It is particularly desirable to provide a large field-of-view display system that provides a high-resolution image in a mosaic display.

Accordingly, it is an object of this invention to provide a high-resolution large field-of-view display system.

Another object of this invention is to provide a high-resolution large field-of-view display system that is a mosaic display system.

A further object of this invention is to provide a high-resolution large field-of-view mosaic display system that avoids gaps caused by display packaging.

A still further object of this invention is to provide a high-resolution large field-of-view mosaic display system that avoids discontinuities at channel boundaries.

It is another object of this invention to provide a high-resolution large field-of-view mosaic display system that employs a plurality of real and virtual image displays.

It is a still further object of this invention to provide a high-resolution large field-of-view mosaic display system that combines multiple display devices.

Another object of this invention is to provide a high-resolution large field-of-view mosaic display system that combines real and virtual display devices.

A further object of this invention is to provide a high-resolution large field-of-view mosaic display system that is compatible with real-time computer image generation devices.

A still further object of this invention is to provide a high-resolution large field-of-view mosaic display system that is compatible with simulation devices.

Additional objects, advantages and other novel features of this invention will be set forth in part in the description that follows and in part will be apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described present preferred embodiments of the invention, simply by way of illustration of the best modes currently known to carry out this invention. As it will be realized, this invention is capable of other different embodiments, and its several details, and specific components, dimensions and materials, are capable of modification in various aspects without departing from the invention. Accordingly, the drawings and descriptions should be regarded as illustrative in nature and not as restrictive.

BRIEF DESCRIPTION OF DRAWINGS

The accompanying drawings incorporated in and forming a part of the specification, illustrate embodiments of the present invention. Some, although not all, alternative embodiments are described in the following description.

In the drawings.

Reference will now be made in detail to the present preferred embodiments of the invention, examples of which are illustrated in the accompanying drawings.

DETAILED DESCRIPTION

This invention is a wide field-of-view display system that is specifically adapted for use in simulation and training systems. Because it is often desirable to provide a very large field of view visual display system that will allow the trainee or user to see the surrounding simulated environment not only directly ahead, but also, in selected applications, to the side, above, below and even behind the trainee/user. The construction of large field-of-view displays that maintain high resolution is achieved by mosaicing or "tiling" image displays from multiple video sources. Traditional techniques for tiling multiple image displays next to each other have been limited because of the physical packaging of each image display, which extends beyond the useable display surface and thereby creating a gap or discontinuity between adjacent displays. This invention addresses this problem along with the edge overlap visual artifacts caused in overlapping display channel systems, such as multiple projectors. This invention provides novel and low-cost solutions to problems encountered in previous attempts to provide high-resolution wide field-of-view display systems. In alternative embodiments, the display channels are butt matched to each other, avoiding overlap of the images from the display channels. This invention provides a mosaic display that includes a plurality of alternating real and virtual images that, depending on the particular application, are either abutted or overlapped and are either electronically or optically blended. The system of the present embodiment of this invention includes: an image display device, a combiner/beamsplitter, a mechanical mounting structure, contrast enhancing light baffles and a light tight enclosure. The present combiner/beamsplitter is constructed from a glass, acrylic, polycarbonate substrate or like material molded or cut into the desired curved shape to ensure good transmissive and reflective properties appropriate for the specific devices and field of view of the combined channels.

Figure 1:
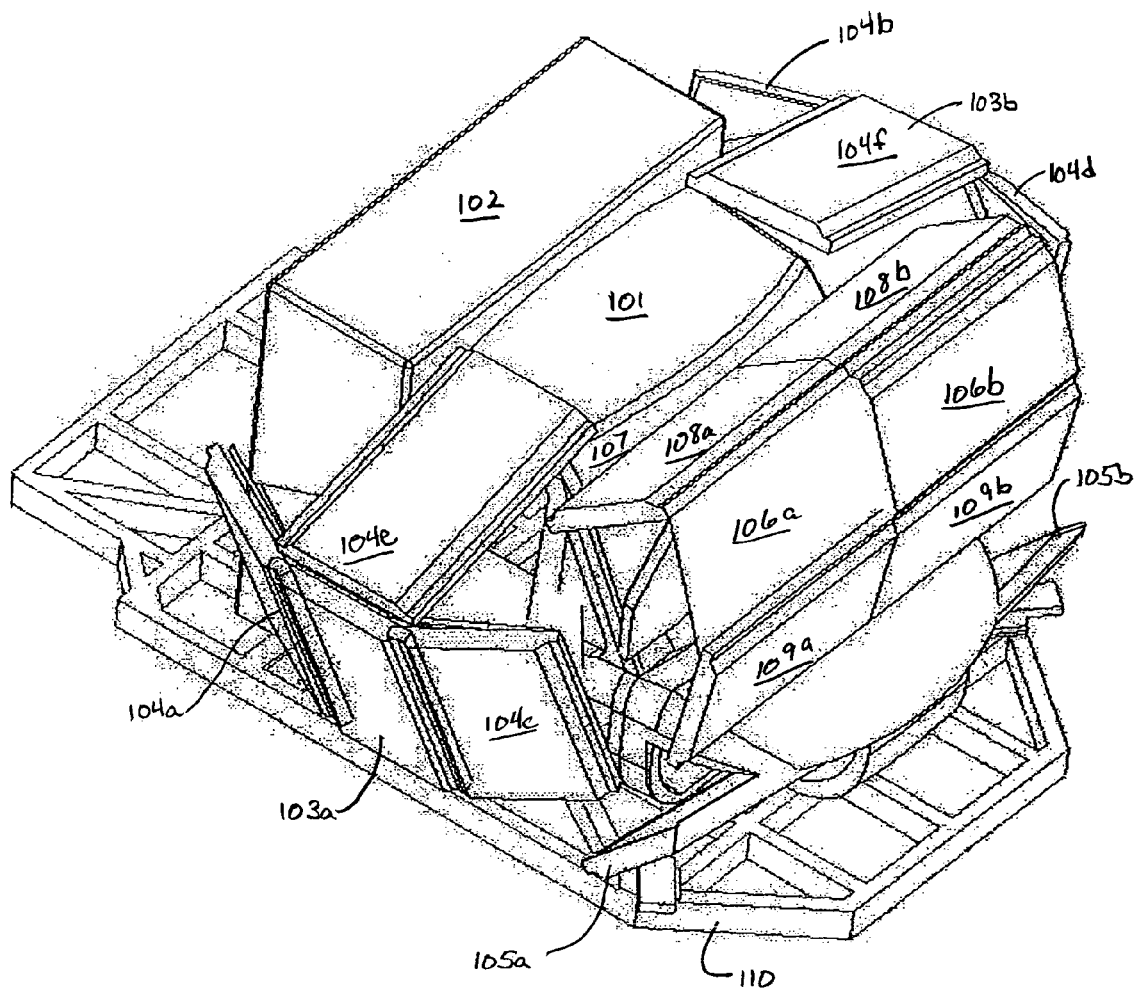
FIG. 1 is a perspective drawing of one embodiment of the display system of this invention mounted on a UH-1 simulation cab.

FIG. 1 shows a perspective drawing of one embodiment of the display system of this invention mounted on a UH-1 simulation cab 101. In a standard training simulator, the simulation cab 101 contains the vehicle specific controls and user/trainee seats positioning the user/trainee into the desired eye-position. An access container 102 is typically attached to the rear of the simulation cab 101. Within the access container 102 is typically found a trainer/maintenance station from which a training person or maintenance engineer monitors the training process and the performance of the simulator system. Depending on the simulation/training task desired, it is often advantageous to have display devices positioned at or about each window of the simulation cab 101. Such positioning permits the user/trainee to be effectively surrounded by simulated imagery thereby fully immersing the user/trainee in the simulated environment. In this FIG. 1, the displays of this invention are shown positioned outside of and about certain windows important for training purposes. A three channel display embodiment 103a, 103b is provided outside each side window. Each three channel display embodiment 103a, 103b shown includes two direct view (real) image display devices 104a, 104b and 104c, 104d and a virtual (combination real and beamsplitter) display 104e, 104f. A right 105a and left 105b chin display is shown positioned outside the right nose window. A pair 106a, 106b of two channel embodiments of the display system is shown mounted in front of the cab 101 forward windscreen 107. Each of the two channel embodiments of the display system 106a, 106b is provided with a virtual display device 108a, 108b and a real display device 109a, 109b. A light baffle, not shown, is typically provided over and between the various display devices to block unwanted light from the simulation cab 101 or other display channels from eroding the system contrast levels of the display system. The simulation cab 101 and the display devices 103a,b, 105a,b, and 106a,b are mounted using traditional mechanical devices, including bolts, welds, pins, screws and the like, to a support frame 110. In sum, this display system of FIG. 1 shows a configured simulator with a six channel display provided for each pilot, consisting of a two channel forward display 106a, 106b, a there channel side display 103a, 103b and a single channel chin window display 105a, 105b. This display system approach provides the advantage, not available with prior real-image based display systems, that both the pilot and the copilot are provided with geometrically correct displayed imagery. Details of the interrelationship of the real and virtual display devices are provided in additional detail in the following drawings and description.

In alternative embodiments, addition or fewer display devices may be mount to or about the simulation cockpit as required by the training task. As noted above, the display devices 103a,b, 104a-f, 105a,b, 106a,b, 108a,b and 109a,b are fixed to one or more support frame(s). In this embodiment the support frame used consists of aluminum structural assemblies that rigidly form the multiple plasma panels together in a fixed geometric relationship. Each multi-channel unit (103a, 103b, 106a, 106b) typically includes its own structural assembly to provide the desired rigidness for use on a simulator motion base. As noted in more detail below, the present preferred mounting structure of the beamsplitter to the typically aluminum support structure is a honeycomb structure provided as a backing plate with precision spacers between the honeycomb structure and each beamsplitter/combiner or the display devices. This support and mounting technique provides an accurate, lightweight and rigid mount for the beamsplitter in the portions of the beamsplitter that operate in the reflective mode. In the areas where the beamsplitter operates in a transmissive mode it does not require the same rigidity, since small beamsplitter movements do not impact the geometric accuracy of the image viewed through the beamsplitter. In alternative embodiments the frame can be composed of one or more support structures. The preferred source image display devices 103a,b, 104a-f, 105a,b, 106a,b, 108a,b and 109a,b of this invention are plasma flat screen displays. These devices provide the source imagery for all real and virtual images. It is the mosaic of alternating real and virtual images that create the continuous scene without gaps. The real images are images viewed on a monitor (or plasma screen) directly through the beamsplitter. Virtual images are images, produced by a monitor (or plasma screen) reflected from a beamsplitter, located so as to appear to be continuous from the adjacent real image(s). In some alternative embodiments CRT's, rear protection screens, LCD light valves, CRT projectors, laser projection devices, organic light emitting diodes and projectors and combinations of CRT's, and projectors can be substituted for the plasma flat screen image display devices without departing from concept of alternative embodiments of the invention. Nevertheless, the preferred image source for virtual images includes a flat panel plasma screen, in combination with a beamsplitter/optical combiner, shown in various configurations and in more detail in FIGS. 4-9. The preferred beamsplitter/optical combiner is shaped in such a manner as it is optically flat in the region used to reflect the image of the folded mirror. This optically flat region is typically centered on the optical axis from the observer's eye-point to the center of the display screen. In this optically flat region of the beamsplitter/combiner, the optical transmission properties are preferably reflective and need not be transmissive.

The beamsplitter/combiner is preferably designed to be extremely rigid and stable in the reflective region. This rigidity is particularly desirable for training/simulation applications that include mounting of the display system on a motion base. The stability of the virtual image is dependent on both the mechanical stability of the display source and on the mechanical stability of the beamsplitter/combiner. In order to achieve this desired stability, the beamsplitter/combiner of the present embodiment of the invention is mounted in the reflective region using a light weight honeycomb structure as a backing plate with precision spacers between the honeycomb structure and the beamsplitter/combiner to provide space for an adhesive while maintaining a nearly constant separation between the honeycomb structure and the beamsplitter/combiner. This mounting technique essentially reduces the optical transmission property of the beam splitter/combiner and the mounting structure to zero in the reflective region, thereby permitting the unwanted transmitted light to be fully absorbed into the mounting structure, rather than becoming scattered and reducing the contrast of the images provided in other display channels. This combination solution to the mechanical mounting and unwanted light absorption problem provides higher system contrast ratio than is generally achievable with prior display designs.

The preferred beamsplitter/combiner is formed into a custom shape that continues across the face of the direct view monitors, rather than simply terminating outside the reflective region. This beamsplitter/combiner design reduces the visibility of the edge of the beamsplitter/combiner and avoids a step down change in brightness from the direct view displays to the reflected monitors. The particular beamsplitter/combiner shape depends on the number of visual display channels, the desired field of view, the size of the display devices being used and the size and shape of the cockpit that the display system is mounted to. A variety of different beamsplitter/combiner combinations are shown in FIGS. 4 through 9.

Figure 2:
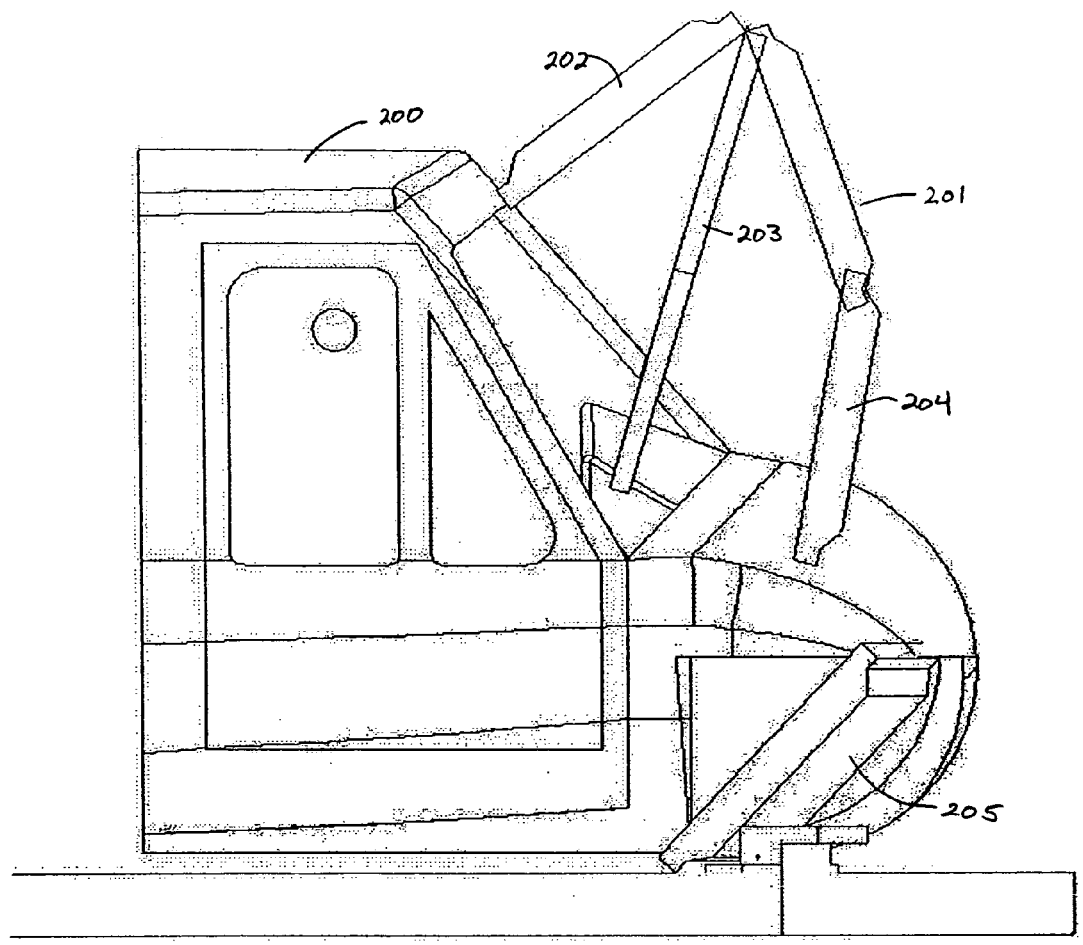
FIG. 2 is a side view of one embodiment of the display system of this invention mounted on a UH-1 simulation cab.

FIG. 2 shows a side view of a two-channel embodiment of the display system of this invention mounted on a UH-1 simulation cab 200. In this embodiment, the two channels are combined to double the vertical field of view that would be available with only a single display device. This view shows the components of the virtual display device 201 including its display source 202 for the virtual image and the beamsplitter/combiner 203 in relation to the cab 200. The direct view display device 204 is shown in line with the beamsplitter/combiner 203 in such a manner as to provide an image to the viewer that is a combination of the virtual display source 202 and the direct view display device 204. A flat panel direct view chin window display 205 is also provided.

Figure 3A:
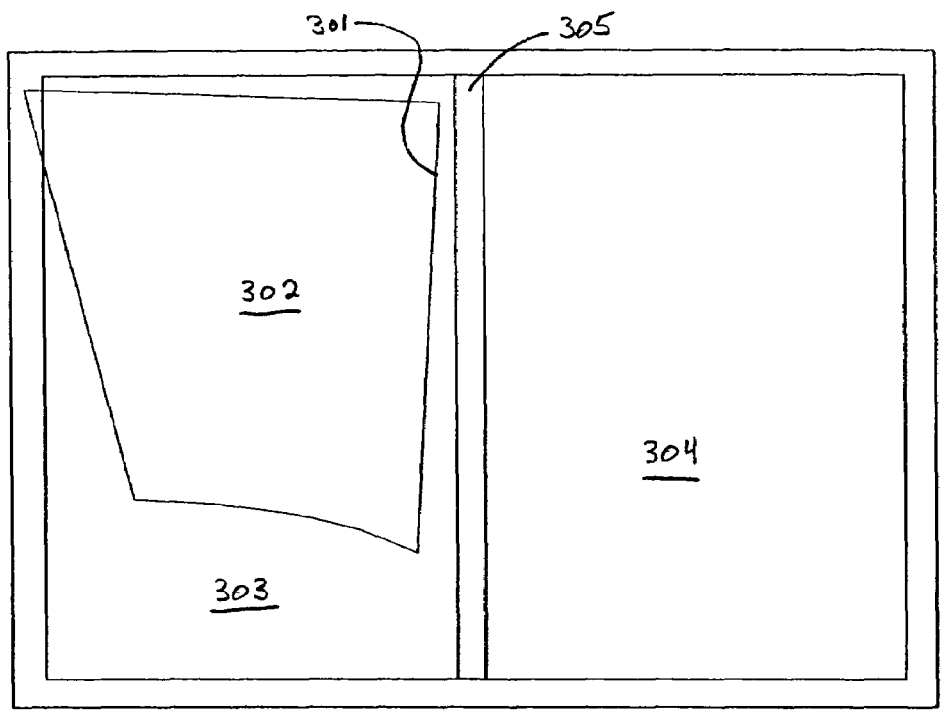
FIG. 3a is a layout view of an embodiment of the display system of this invention.
Figure 8:
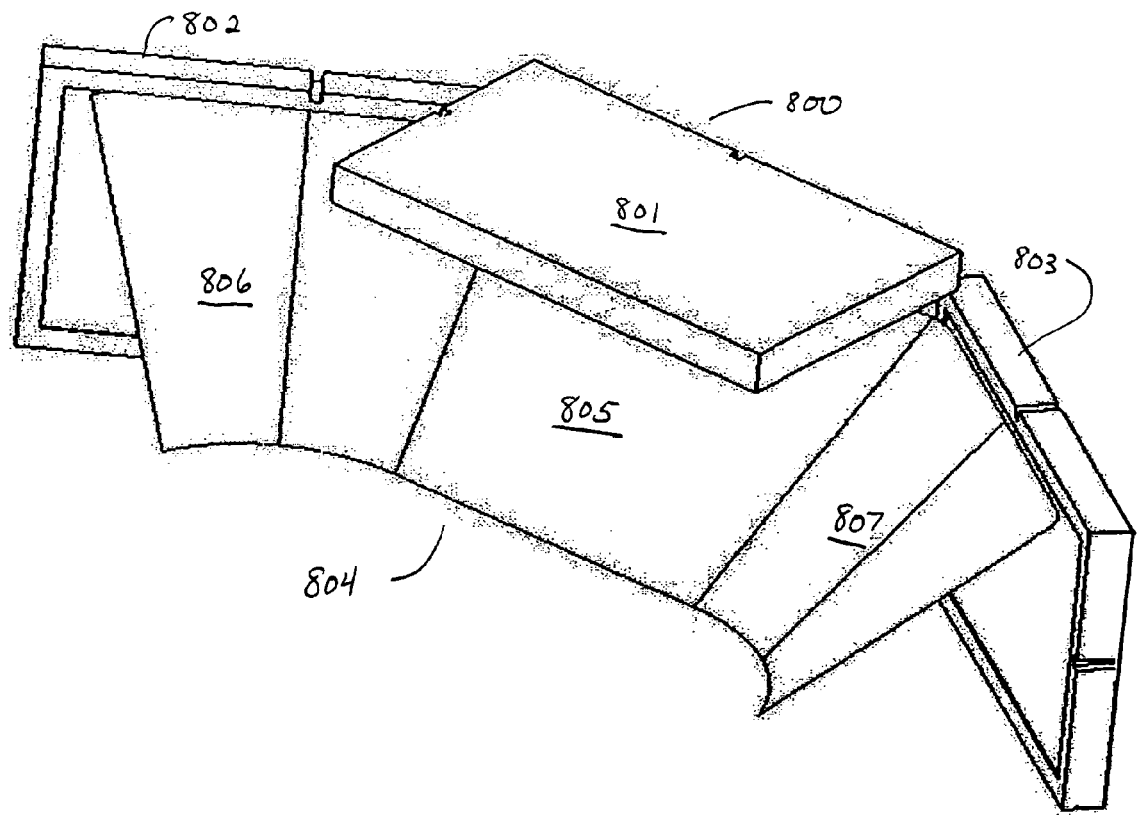
FIG. 8 is a perspective view of a three channel alternative embodiment of the display system of this invention.

FIG. 3a shows a layout view of an embodiment of the display system of this invention showing two (2) channels of the basic solution for a three-channel combination real and virtual mosaic display similar to that used on the side channel assembly of FIG. 1. The center channel virtual image is formed from a real image display device which is folded up into a vertical position, the image 303 of which is located by virtue of the beamsplitter/combiner 302. An additional alternative view of this three-channel combination display is shown in FIG. 8. The beamsplitter/combiner 302 creates the virtual image of the vertical mounted center channel between the actual real images of the two side channels 303, 304. The edge of the virtual image 301 can be abutted to the edge of the two real images 303, 304 or in alternative embodiments can be overlapped and edge blended to create a smooth and continuous image. In the example embodiment, the two real images 303, 304 are overlapped and edge blended 305, creating a smooth and continuous image between them.

Figure 3B:
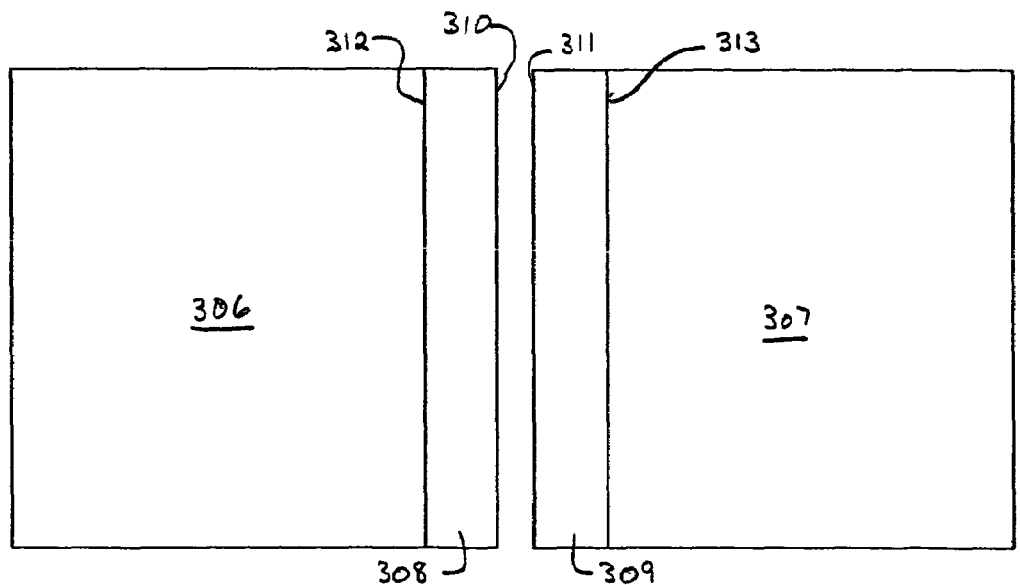
FIG. 3b is a view of two of the display channels of this invention with edge blending.

FIG. 3b shows a view of two of the display channels of this invention with edge blending. A left channel 306 is shown having a right edge 310 and an edge blended region 308 along the right edge 310. In the present embodiment of the edge blending of this invention, a variable silk-screened mask provides the edge blending 308. The variable silk screened mask has a generally linear brightness blocking profile with 100% transmission along the left edge 312 of the edge blended region 308 to 0% transmission along the right edge 310 of the edge blended region 308. A right channel 307 is shown having a left edge 311 and an edge blended region 309 along the left edge 311. In the present embodiment of the edge blending of this invention, a variable silk-screened mask provides the edge blending 309. The variable silk screened mask has a generally linear brightness blocking profile with 100% transmission along the right edge 313 of the edge blended region 309 to 0% translucence along the left edge 311 of the edge blended region 309. Once installed and aligned the left channel 306 overlaps the right channel 307 with the edge blending regions 308, 309 only overlapping each other. The resulting combined edge blending regions 308, 309 have a total translucence equal to 50% across the edge-blending region. Since the light produced by the display devices of each channel is summed in the overlapping edge blended region 308, 309 providing twice as much brightness as in the non overlapped parts of the left 306 and right 307 display channels, the 50% translucence divides the resulting brightness by a factor of two, resulting in a constant, smooth and continuous image across the channel boundaries between the left 306 and right 307 channels.

In alternative embodiments, rather than edge blending the adjacent display channels are butt matched. Digital display panels, such as plasma or liquid crystal displays, provide an image free of drift because the pixels are physically built into the display device substrate and do not drift over time. This capability provides the opportunity to maximize the system field of view and resolution by not overlapping adjacent display devices. In this embodiment, the virtual image is placed with great precision to physically match the adjacent real image. Projection or CRT display devices cannot be placed with the desired precision because of the distortion generated by the projection optics or CRT tube. Precision edge matching is an important feature of the digital display panel embodiments of this invention.

Figure 4:
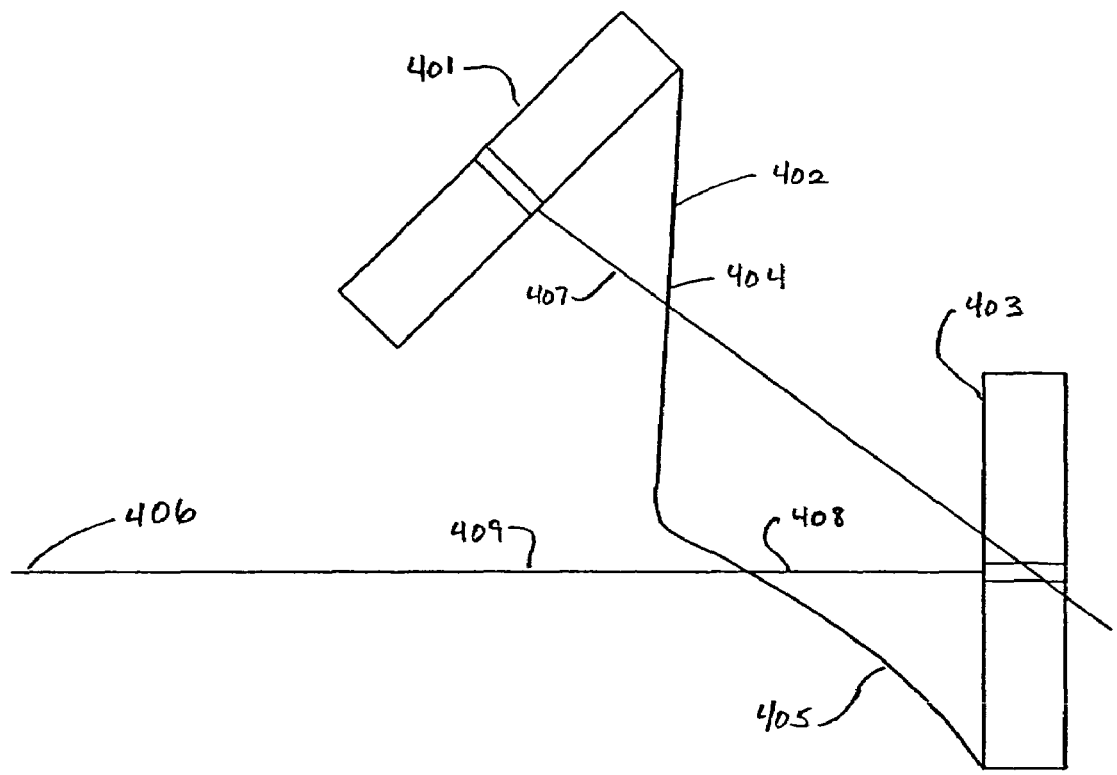
FIG. 4 is a schematic side view of an embodiment of the display system of this invention.

FIG. 4 shows a schematic side view of an embodiment of the display system of this invention. A real image display device 401 provides a virtual image along the optical axis 407 of the real image display device 401 reflected off region 404 of the beamsplitter/combiner 402. The direct view display device 403 provides a real image along optical axis 408 through the transmissive region 405 of the beamsplitter/combiner 402. The combined reflected image and transmitted image is provided along optical axis 409 to the user/trainee's eye position 406. The beamsplitter/combiner 404 of this invention is provided with an optically flat folded display region 402 and a direct view display region 405. The beamsplitter/combiner transitions between the two regions 404, 405 in a smooth and continuous manner to avoid introducing optical distortion into the directly view display imagery. In the direct view region 405 the beamsplitter/combiner 402 is transmissive and need not be reflective. The beamsplitter/combiner 402 need not be flat in this 405 region and can have any radius of curvature that does not introduce optical distortion or unwanted reflections from other display devices in the system. While in the folded display region 404, the beamsplitter/combiner 402 is reflective. The beamsplitter/combiner 402 is designed to take advantage of the optical property that as long as the radius of curvature is kept large, the optical distortion will not be noticeable and provides the mutually exclusive optical qualities needed in both the reflective 404 and the transmissive 405 regions.

The present preferred beamsplitter/combiner 404 of this invention is provided with a front surface optically reflective coating that is designed to have about 50% transmission and 50% reflective characteristics across the full frequency range of the visible spectrum. This coating, although not necessary in all embodiments and uses of the invention, maintains a smooth and continuous image in the blend region while the user/trainee physically moves his/her head within the design envelope. Moreover, the use of this coating maintains the consistency of brightness of the virtual reflected image and the direct view transmitted image regardless of which portion of the beamsplitter/combiner 404 each eye of the user/trainee is looking through at the region of the channel boundary. The back side surface of the beamsplitter is preferably coated with an anti-reflective coating to minimize any ghost images that might otherwise be reflected off of the back side of the beamsplitter.

Figure 5:
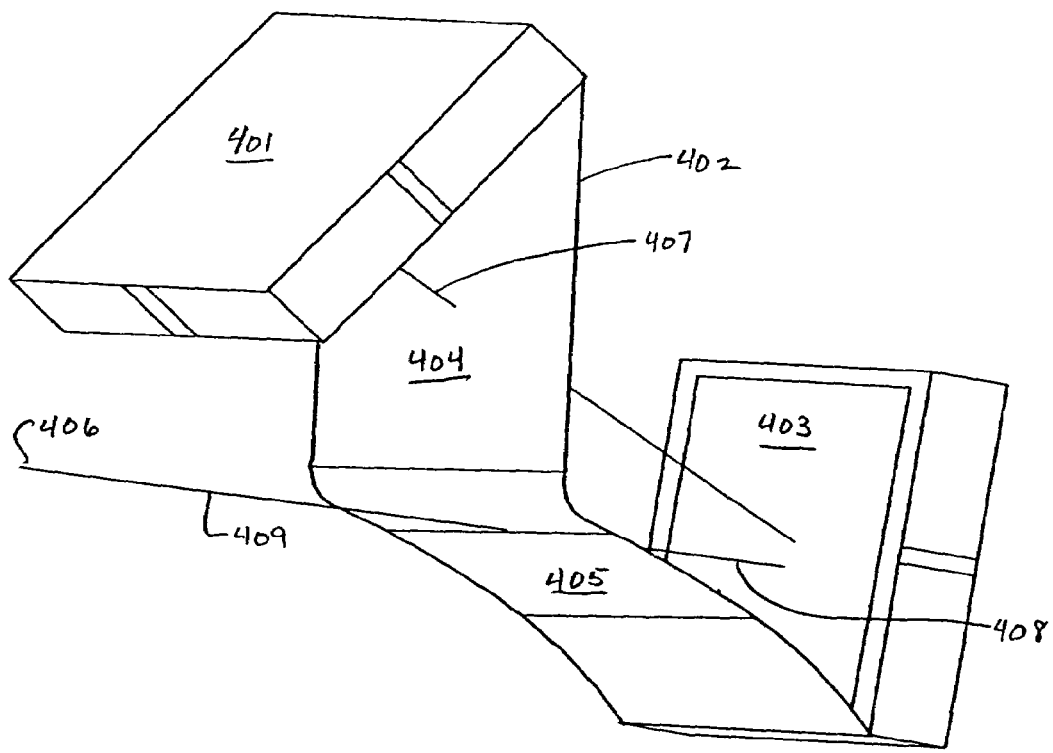
FIG. 5 is a perspective view of an embodiment of the display system of this invention.

FIG. 5 shows a perspective view of the embodiment of the display system of this invention shown in FIG. 4. This view provides an additional perspective on the alignment of the real image display source 401 for the virtual image that is adjacent to the direct view display 403, the beamsplitter/combiner 402, with the reflective region 404 and the transmissive region 405, and the direct view display 403.

Figure 6:
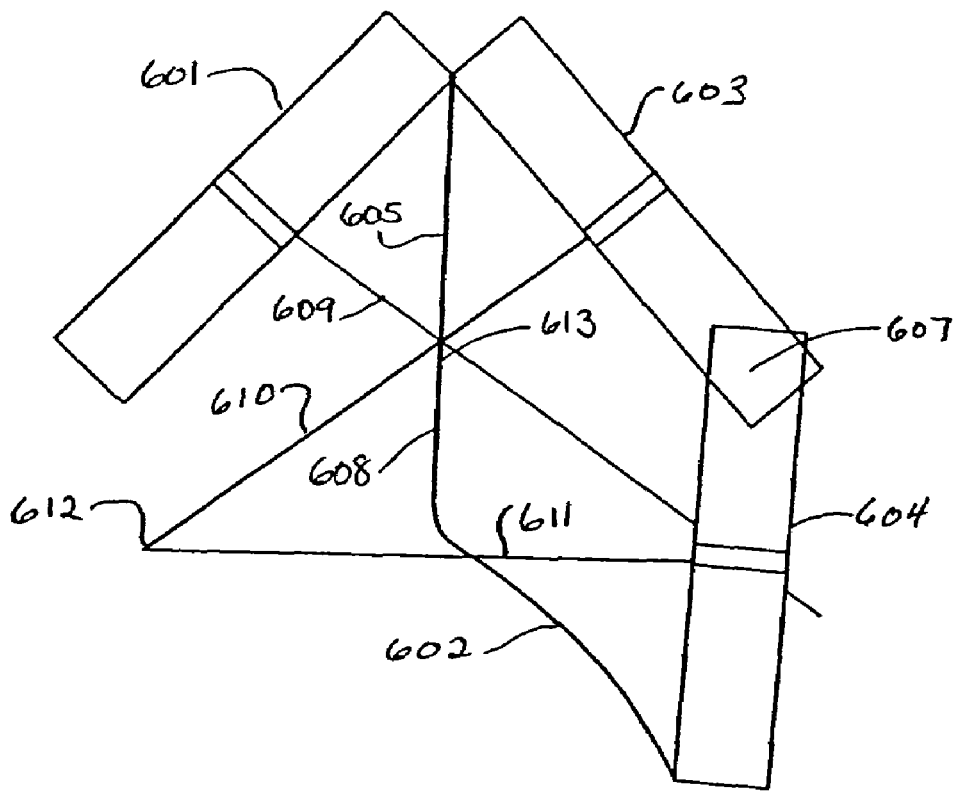
FIG. 6 is an alternative schematic side view of an embodiment of the display system of this invention.

FIG. 6 shows a schematic side view of the two-channel configuration with the virtual image modeled so that it can be seen where it falls compared to the two real images in the display system of this invention. The display 601 providing the virtual image source is shown with is virtual image 603 shown in relation to the direct view image source display 604. The optical axis 609 of the 601 display, the optical axis 610 of the virtual display 603 and the optical axis 611 of the real direct view image display 604 are shown relative to the beamsplitter/combiner 613. The direct view display 604 is designed to overlap with an edge-blending region 607 of the virtual image display 603. The virtual image 603 is generated from the reflective region 605 of the beamsplitter/combiner 608. The combined reflected image 603 and transmitted image 604, which provides its transmitted image on the optical axis 611 through a transmissive region 602 of the beamsplitter/combiner 608 is provided to the user/trainee's eye position 612. The beamsplitter/combiner 605 of this invention is provided with an optically flat folded display region 605 and direct view display regions 613 and 602. The beamsplitter/combiner 608 transitions between the regions 605, 613, 602 in a smooth and continuous manner to avoid introducing optical distortion into the directly view display imagery. In the direct view regions 613, 602 the beamsplitter/combiner 608 is transmissive and need not be reflective. The beamsplitter/combiner 608 need not be flat in these 613, 602 regions and can have any radius of curvature that does not introduce optical distortion or unwanted reflections from other display devices in the system. While in the folded display region 605, the beamsplitter/combiner 608 is reflective. The beamsplitter/combiner 608, of this embodiment, is also designed to take advantage of the optical property that as long as the radius of curvature is kept large, the optical distortion will not be noticeable and provides the mutually exclusive optical qualities needed in both the reflective 605 and the transmissive 613, 602 regions.

The present preferred beamsplitter/combiner 605 of this invention also is provided with a coating that is designed to have about 50% transmission and 50% reflective characteristics across the full frequency range of the visible spectrum. This coating, although not necessary in all embodiments and uses of the invention, maintains a smooth and continuous image in the blend region while the user/trainee physically moves his/her head within the design envelope. Moreover, the use of this coating maintains the consistency of brightness of the virtual reflected image and the direct view transmitted image regardless of which portion of the beamsplitter/combiner 608 each eye of the user/trainee is looking through at the region of the channel boundary.

Figure 7:
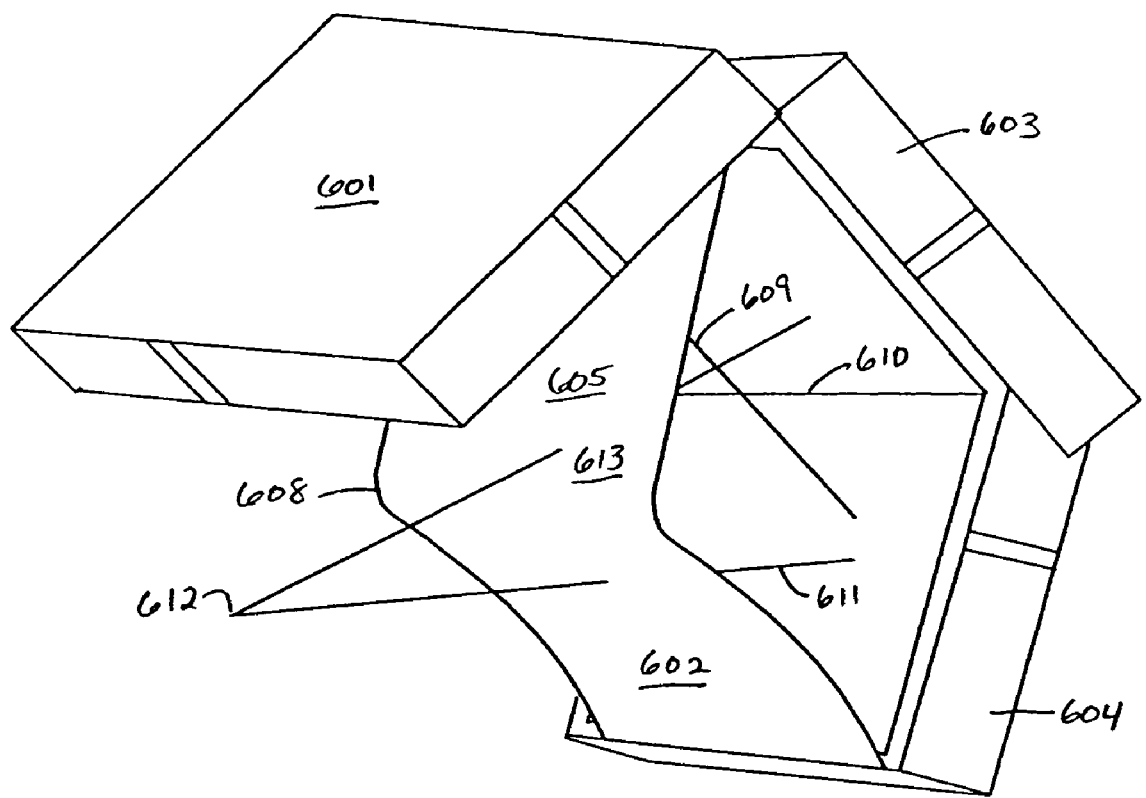
FIG. 7 is an alternative perspective view of an embodiment of the display system of this invention.

FIG. 7 shows a perspective view of the embodiment of FIG. 6 of the display system of this invention. This view provides an additional perspective on the alignment of the virtual image display 601, the beamsplitter/combiner 608, with the reflective region 605 and the transmissive regions 613, 602, the virtual image 603 and direct view display 604.

FIG. 8 shows a perspective view of another alternative three channel embodiment 800 of the display system of this invention. A virtual image source display 801 is shown configured so as to project its image on the reflective portion 805 of the beamsplitter/combiner 804. Two real image displays 802, 803 are shown configured so as to permit their images to be passed through the transmissive portions 806, 807 of the beamsplitter/combiner 804. This embodiment shows the edges matched by edge butting between the displays 802, 803 and the virtual image from display 801. In alternative embodiments the beamsplltter/combiner may include a blend region between the transmissive portions 806, 807 and the reflective portion 805 of the beamsplitter/combiner 804.

Figure 9:
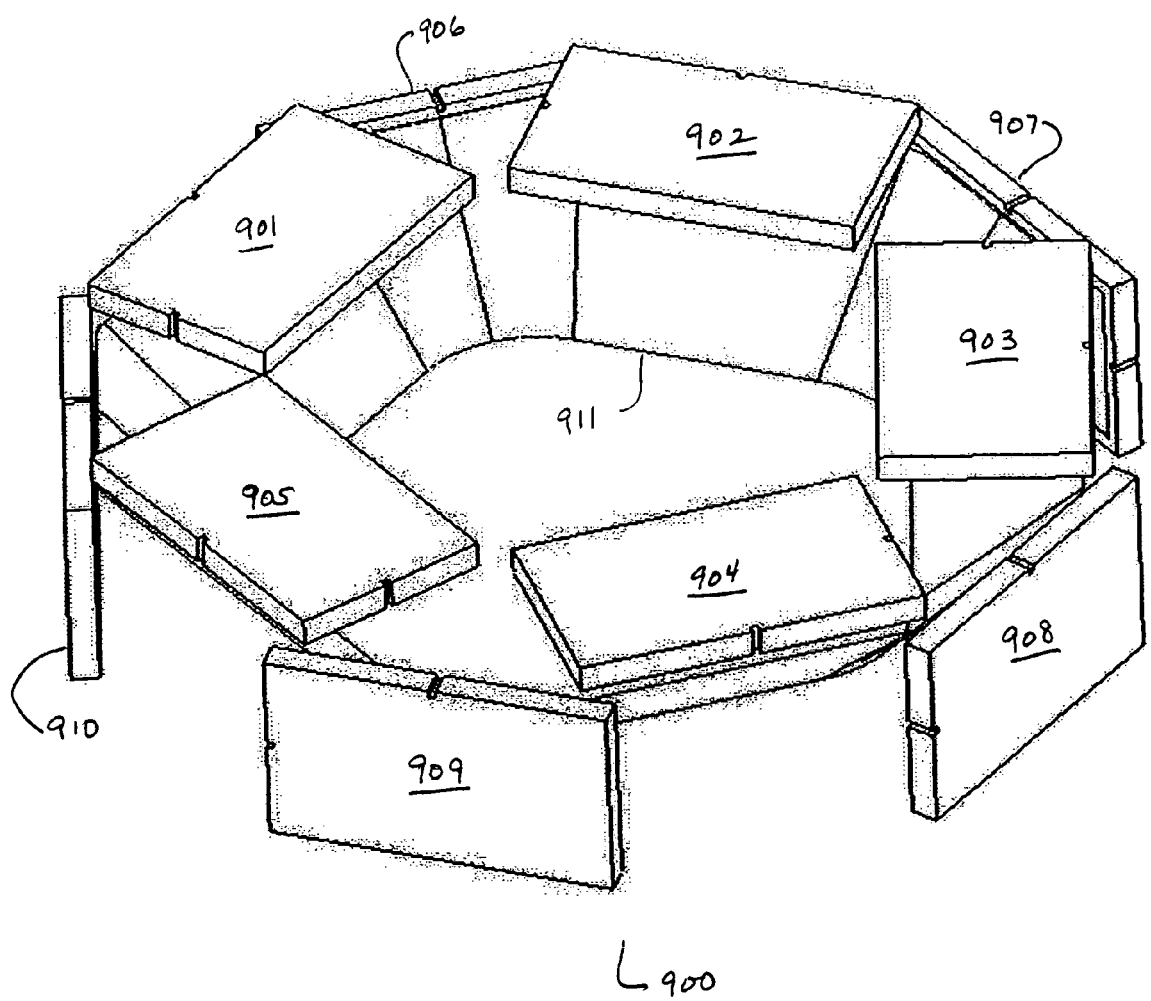
FIG. 9 is a perspective view of a ten channel alternative embodiment of the display system of this invention.

FIG. 9 shows a perspective view of a further alternative embodiment of the display system of this invention. In this embodiment 900 ten (10) channels are provided to give a full 360-degree field of view. The image source displays 901, 902, 903, 904, 905 for the virtual images are shown above the reflective portions of the beamsplitter/combiner 911, while the direct view (real image) displays 906, 907, 908, 909, 910 are shown behind the transmissive portions of the beamsplitter/combiner 911. This embodiment of the invention is particularly beneficial for use in the simulation/training for vehicles with a large number of windows, such as ground vehicles, or which otherwise benefit from high resolution and very large fields of view, such as fighter aircraft.

It is to be understood that the above-described embodiments and examples are merely illustrative of numerous and varied other embodiments and applications which may constitute applications of the principles of the invention. These above-described embodiments are provided to teach the present best mode of the invention only, and should not be interpreted to limit the scope of the claims. Such other embodiments, may use somewhat different steps and routines which may be readily devised by those skilled in the art without departing from the spirit or scope of this invention and it is our intent that they are deemed to be within the scope of this invention.

The invention claimed is:

1. A display system for presentation of a multi-display visually continuous simulation to a person located at an eye-position, comprising:
   (A) a direct view display device in a position defining an optical axis whereby a real image can be seen at about the eye-position;
   (B) a beamsplitter/coupler comprising a transmissive region intersecting said optical axis and transmitting the real image of said direct view display device to said eye-position, wherein said beamsplitter/coupler further comprises a reflective region;
   (C) a virtual display device producing a virtual image, wherein said virtual display device is positioned to reflect on said reflective region of said beamsplitter/coupler to produce a reflected image from said virtual image to said eye-position;
   (D) an edge matching device blending said real image to said reflected image in a smooth and continuous scene as seen at said eye-position; and
   wherein said beamsplitter/coupler and said edge matching device are configured to present an abutted or an overlapped view of said real image and said virtual image to said eye-position.

2. A display system, as recited in claim 1, wherein said virtual display device is an electronic flat screen display device.

3. A display system, as recited in claim 1, wherein said virtual display device is a plasma flat screen display device.

4. A display system, as recited in claim 3, wherein said edge matching device provides a butt match of said real image to said reflected image as seen by a person at said eye-position.

5. A display system, as recited in claim 4, wherein said butt matching of said real and said reflected images are provided for by pixel precision of said displays.

6. A display system, as recited in claim 1, wherein said edge matching device is an edge blending device blending the edges of said real image and said reflected image together.

7. A display system, as recited in claim 1, wherein said virtual display device is selected from the group consisting of CRT monitors, rear projection screens, LCD light valves, plasma screens, CRT projectors, laser projectors and organic light emitting diodes.

8. A display system, as recited in claim 1, wherein said direct view display device is an electronic flat screen display device.

9. A display system, as recited in claim 1, wherein said direct view display device is a plasma flat screen display device.

10. A display system, as recited in claim 1, wherein said direct view display device is selected from the group consisting of CRT monitors, rear projection screens, LCD light valves, CRT projectors, laser projectors and organic light emitting diodes.

11. A display system, as recited in claim 1, wherein said beamsplitter/combiner further comprises an optical device which further comprises a curved transmissive and reflective device which comprises a material selected from the group consisting of glass, acrylic and polycarbonate.

12. A display system, as recited in claim 1, wherein said beamsplitter/combiner further comprises a beamsplitter coating designed to provide about 50% transmission and 50% reflection characteristics across the visual spectrum.

13. A display system, as recited in claim 1, further comprising a frame holding said direct view display device, said virtual display device and said beamsplitter/combiner about a user/trainee position.

14. A display system, as recited in claim 13, wherein said frame further comprises a honeycomb structure backing plate and a plurality of spacers between said honeycomb structure backing plate and said beamsplitter/combiner device.

15. A display system, as recited in claim 1, wherein said edge blending device further comprises a linearly light blocking silk screened vinyl mask fixed to an edge of said direct view display device.

16. A display system, as recited in claim 1, wherein said edge blending device further comprises a linearly light blocking silk screened vinyl mask fixed to an edge of said virtual display device.

17. A display system, as recited in claim 1, further comprises a light baffle preventing unwanted light from cross illuminating the two display channels formed by the combination of said displays and said beamsplitter/coupler.

18. A display system, as recited in 17, wherein said baffle cooperates with said display devices to provide high contrast levels.

19. A display system, as recited in claim 1, further comprising a second virtual display device.

20. A display system, as recited in claim 1, further comprising a second direct view display device.

21. A display system, as recited in claim 1, wherein said real image and said reflected image overlap each other.

22. A display system, as recited in claim 1, wherein said real image and said reflected image are butt matched to each other.

23. A display system, as recited in claim 1, further comprising a mosaic display alternating images from said virtual image display device and said direct view display device.

24. A display system, as recited in claim 1, wherein said virtual display device and said direct view display device are orientated so as to provide independent geometric correct images to more than one individual in a cockpit.

* * * * *